United States Patent
Chaouch et al.

(10) Patent No.: US 10,305,593 B1
(45) Date of Patent: *May 28, 2019

(54) METHOD FOR SELF-CALIBRATION OF AN ELECTRICAL AND/OR OPTICAL CHANNEL

(71) Applicant: Arista Networks, Inc., Santa Clara, CA (US)

(72) Inventors: Hacene Chaouch, Santa Clara, CA (US); Andrew Tamoney, Jr., Santa Clara, CA (US)

(73) Assignee: ARISTA NETWORKS, INC., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/864,906

(22) Filed: Jan. 8, 2018

Related U.S. Application Data (63) Continuation of application No. 15/291,927, filed on Oct. 12, 2016, now Pat. No. 9,866,326.

(51) Int. Cl.
    *H04B 10/00* (2013.01)
    *H04B 10/2507* (2013.01)

(52) U.S. Cl.
    CPC .............. *H04B 10/25073* (2013.01)

(58) Field of Classification Search
    USPC ................................. 398/21–38
    See application file for complete search history.

(56) References Cited

U.S. PATENT DOCUMENTS

| | | | | |
|---|---|---|---|---|
| 6,542,555 | B2 * | 4/2003 | Dally | H04L 25/03343 333/28 R |
| 7,099,404 | B2 * | 8/2006 | Dally | H04L 25/03343 333/28 R |
| 7,397,848 | B2 * | 7/2008 | Stojanovic | H04L 25/063 375/229 |
| 7,535,980 | B2 * | 5/2009 | Yang | H04L 25/03019 375/350 |
| 9,866,326 | B1 * | 1/2018 | Chaouch | H04B 10/25073 |

(Continued)

*Primary Examiner* — Agustin Bello
(74) *Attorney, Agent, or Firm* — Womble Bond Dickinson (US) LLP (57) ABSTRACT

An auto-equalization network device for optical transmitting and receiving is provided. The device includes a network device having an optical transmitter and an optical receiver. The network device is configured to determine a frequency domain forward transmission loss characterization for a signal transmitted by the optical transmitter, looped back and received by the optical receiver. The device is configured to generate a model in the frequency domain having control points based on the characterization, generate and load finite impulse response (FIR) filter taps into a finite impulse response filter based on the model in the frequency domain. The device is configured to iterate transmission of a signal with frequency-dependent preemphasis by the finite impulse response filter, characterization for the frequency-dependent preemphasized signal as looped back and received by the optical receiver, comparison to previous characterization, adjustment of the control points, and reloading the finite impulse response filter taps, until the comparison meets an optimum, so that the network device is auto-equalized for optical transmitting.

20 Claims, 5 Drawing Sheets

(56) References Cited

U.S. PATENT DOCUMENTS

| | | | |
|---|---|---|---|
| 2001/0024477 A1* | 9/2001 | Haycock | H03F 3/45771 375/296 |
| 2003/0156603 A1* | 8/2003 | Rakib | H03M 13/256 370/485 |
| 2004/0022311 A1* | 2/2004 | Zerbe | H04L 25/03038 375/229 |
| 2004/0037374 A1* | 2/2004 | Gonikberg | H04L 25/03229 375/341 |
| 2005/0201454 A1* | 9/2005 | Chaudhuri | H04L 25/03343 375/229 |
| 2005/0281355 A1* | 12/2005 | Cranford, Jr. | H04L 27/06 375/316 |
| 2006/0067387 A1* | 3/2006 | Ahmed | H04B 10/07 375/219 |
| 2006/0093028 A1* | 5/2006 | Balan | H04L 25/03343 375/233 |
| 2006/0245765 A1* | 11/2006 | Elahmadi | H04B 10/2513 398/189 |
| 2008/0198915 A1* | 8/2008 | Gorecki | H04L 25/03038 375/232 |
| 2012/0076502 A1* | 3/2012 | Swanson | H04B 10/0795 398/136 |
| 2012/0207196 A1* | 8/2012 | Zerbe | H04L 1/0026 375/219 |
| 2013/0329832 A1* | 12/2013 | Morita | H04B 1/0475 375/296 |
| 2015/0037034 A1* | 2/2015 | Renaudier | H04L 1/0035 398/65 |
| 2015/0156040 A1* | 6/2015 | Matsudaira | H04L 27/01 375/232 |
| 2015/0295650 A1* | 10/2015 | Lee | H04B 10/2575 398/115 |
| 2016/0112138 A1* | 4/2016 | Alfiad | H04B 10/50572 398/182 |
| 2016/0285657 A1* | 9/2016 | Yu | H04B 10/0799 |
| 2016/0308693 A1* | 10/2016 | Stojanovic | H04L 25/063 |
| 2017/0180055 A1* | 6/2017 | Yu | H04B 10/612 |
| 2018/0006852 A1* | 1/2018 | Zerbe | H04L 1/0026 |

* cited by examiner

METHOD FOR SELF-CALIBRATION OF AN ELECTRICAL AND/OR OPTICAL CHANNEL

BACKGROUND

Placing a digital signal processor inside a pluggable module, for a network device, allows short interconnect lines between the digital signal processor (DSP) and photonic integrated circuits (PIC) such as a solid-state laser and integrated optical receiver, for fiber-optic communication. Packaging density could be improved by moving digital signal processors from the pluggable modules to the main body of the network device. But, this makes longer interconnect lines between a digital signal processor in the main body of the network device and the photonic integrated circuits in the pluggable modules, and introduces greater losses plus additional connector losses and reflections to manage and compensate. These problems are ever more critical for increasing modulation levels of Quadrature Phase Shift Keying (QPSK), 8-Quadrature amplitude modulation (QAM), 16-QAM, 32-QAM, 64-QAM, etc. It is within this context that the embodiments arise.

SUMMARY

In some embodiments, an auto-equalization network device for optical transmitting and receiving is provided. The device includes a network device having an optical transmitter and an optical receiver. The network device is configured to determine a frequency domain forward transmission loss characterization for a signal transmitted by the optical transmitter, looped back and received by the optical receiver. The device is configured to generate a model in the frequency domain response having control points based on the characterization, generate and load finite impulse response (FIR) filter taps into a finite impulse response filter based on the model in the frequency domain. The device is configured to iterate transmission of a signal with frequency-dependent preemphasis by the finite impulse response filter, characterization for the frequency-dependent preemphasized signal as looped back and received by the optical receiver, comparison to previous characterization, adjustment of the control points, and reloading the finite impulse response filter taps, until the comparison achieves an optimum, so that the network device is auto-equalized for optical transmitting.

Other aspects and advantages of the embodiments will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Embodiments of a network switch or other network device with digital signal processors in the main body providing frequency-dependent preemphasis for transmitted signals and auto-equalization for a finite impulse response filter are described herein. The network device models a transmission/loopback/receive interface in the frequency domain, using an S21 characterization. From the model, the network device generates taps for a finite impulse response filter, and loads the taps. The finite impulse response filter adds frequency-dependent preemphasis to the transmitted signal as configured by the taps. A loopback fixture returns the signal to the receiver of the network device, where the received signal is measured by the network device. This process is iterated by the network device, as the control points to the model are adjusted and new finite impulse response filter taps are tried out. Once an optimum is found, resultant filter taps (or modified versions of these) are retained in the finite impulse response filter, thus optimizing the frequency-dependent preemphasis to the transmitted signal for the specific plug-in modules. These taps may also be stored in non-volatile memory of the network switch for future use. The optimized frequency-dependent preemphasis is a time domain adjustment of the transmitted signal that compensates for the frequency-dependent losses in the channel.

Embodiments for auto-equalization described herein solve a problem brought about by time domain finite impulse response filters having many taps, for example 65 taps in a digital signal processor. With this many degrees of freedom, auto calibration can be difficult. Providing a default calibration setting that is "good enough" may suffice for some systems, but does not account for changes in equipment, such as replacement or aging of transmit or receive modules. With analog interfaces, an improvement in calibration will directly improve field performance for users. Solutions described herein enable a user to set up a system in a loopback configuration and calibrate for optimal performance. The system performs a method to calibrate finite impulse response filters using a frequency domain approach. This can be applied in manufacturing or in the field.

Figure 1:
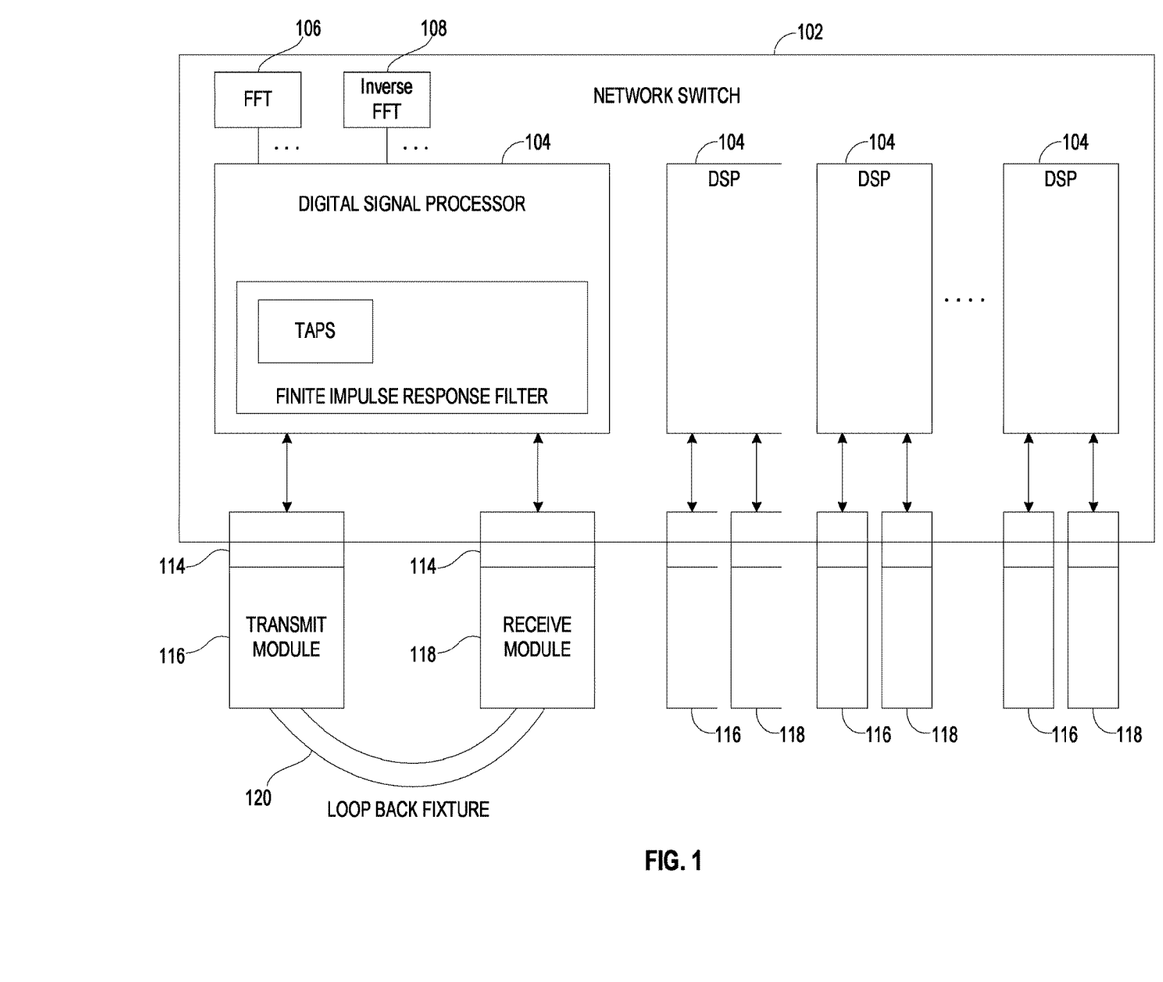
FIG. 1 is a block diagram showing digital signal processors in a network switch with pluggable modules in accordance with some embodiments.

FIG. 1 is a block diagram showing digital signal processors 104 in a network switch 102 with pluggable modules 116, 118. The network switch 102 could have one or more digital signal processors, each associated with connectors 114 for a transmit module 116 and a receive module 118.

Alternatively, the transmit module and receive module could be combined. Additionally, the digital signal processor could have one or more transmitter or receivers connected to it. In this embodiment, the transmit module has an optical integrated circuit for optical transmission, and the receive module 118 has a further optical integrated circuit for optical receiving, for example using fiber optic cabling. A loopback fixture 120 couples the transmit module 116 and the receive module 118, so that a signal transmitted out by the transmit module 116 is looped back and received by the receive module 118. This is for the purpose of auto-equalization of the network switch 102. After auto-equalization, the loopback fixture 120 is removed, and regular optical cabling is installed for normal usage. This can be achieved by using physical optical fiber or using an optical switching device. Even though the regular optical cabling would be much longer than the length of fiber optic cabling in the loopback fixture 120, this would not appreciably affect losses relative to frequency as fiber optics has the characteristic of relatively flat loss across a very large range of frequency.

Still referring to FIG. 1, the network switch 102 has a fast Fourier transform (FFT) module 106, and an inverse fast Fourier transform (inverse FFT or IFFT) module 108. The digital signal processor has a finite impulse response (FIR) filter 112 with finite impulse response filter taps 110. Digital signal processors with these capabilities are readily available in the commercial market, and can be programmed in accordance with the present disclosure. In one embodiment, the digital signal processor just has taps, and all of the FFT and IFFT determinations are performed by a processor that is part of the network switch 102. It is conceivable that future digital signal processors could take on many or all of these tasks.

Figure 2:
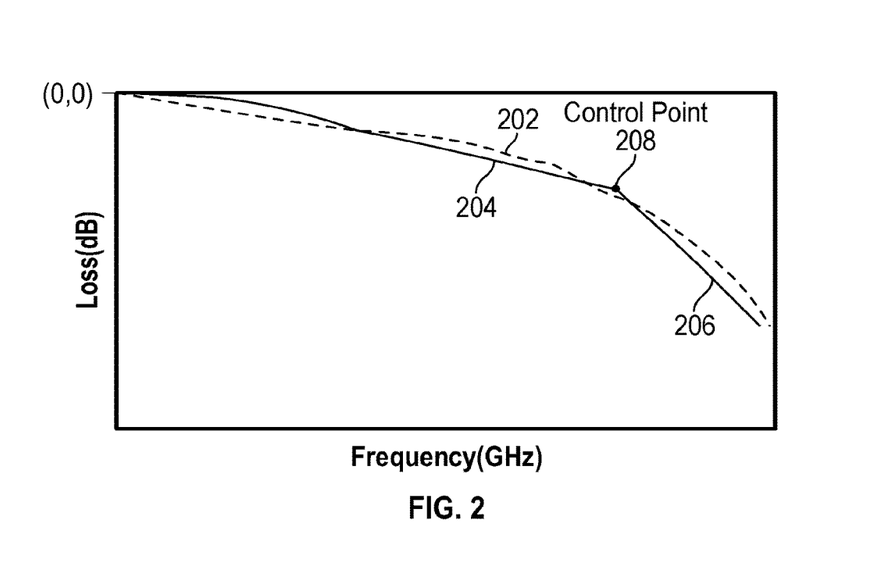
FIG. 2 is a diagram of an S21 representation of a forward transfer characteristic in the frequency domain, for a signal as transmitted by the network switch, looped back and received by the network switch, overlaid with an example model that has two lines and three degrees of freedom in accordance with some embodiments.

FIG. 2 is a diagram of an S21 representation of a forward transfer characteristic 202 in the frequency domain, for a signal as transmitted by the network switch, looped back and received by the network switch 102, overlaid with a model 204, 206 that has two lines and can be described with three degrees of freedom. To compensate for the forward transmission losses, in the frequency domain, of a signal that is transmitted by the optical transmitter of the network device, looped back, and received by the optical receiver of the network device, the network switch 102 performs a fast Fourier transform on a S21.

S21 characterization is a known technique for characterizing frequency dependent losses of a channel from input to output. The network switch 102 can be programmed to perform S21 characterization, in the frequency domain, as illustrated in FIG. 2. Once this is done, the network switch 102 (e.g., the digital signal processor 104, or in some embodiments a processor assisting or cooperating with the digital signal processor 104) generates a model for the above-described interface, that approximates the S21 characterization. One model 204, 206, with three degrees of freedom is illustrated in FIG. 2. Other models with four or five or more degrees of freedom are readily developed in keeping with the teachings herein. For some embodiments, a model in the range of three to five degrees of freedom (inclusive) is preferred. The model 204, 206 in one embodiment has one line segment 204 from (i.e., anchored at) a fixed control point at the origin (0, 0) to a variable control point 208, and another line or line segment 206 from (i.e., anchored at) the variable control point 208 to another control point or out to infinity, at a defined slope. Since the variable control point 208 can move in the X and Y directions, for two degrees of freedom, and the defined slope has another degree of freedom, this model has three degrees of freedom.

It should be appreciated that one goal of calibrating the network switch 102 is to compensate for the channel, regardless of the pulse shape chosen. Calibrating the network switch 102 allows the network switch 102 to properly pulse shape.

Figure 3A:
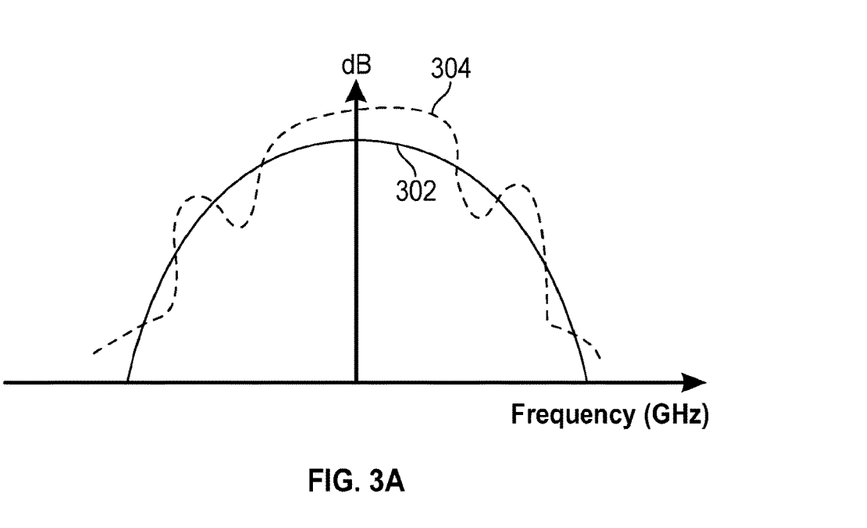
FIG. 3A is a diagram of a desired spectrum in the frequency domain, for the looped back signal, showing effects of varying control points of the model and resultant finite impulse response filter taps in accordance with some embodiments.

FIG. 3A is a diagram of a desired spectrum 302 in the frequency domain, for the looped back signal, showing effects of varying control points of the model and resultant finite impulse response filter taps. The desired spectrum 302 is shown in solid line, and the spectrum with bad S21 compensation 304 is shown in dashed line. It is the rolloff and pulse shaping that controls this shape. These are applied to a properly characterized S21 to achieve spectral efficiency.

Figure 3B:
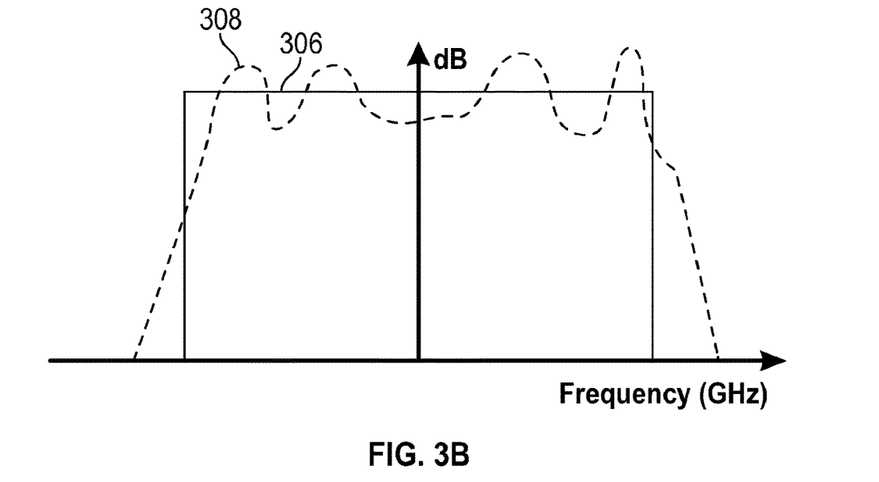
FIG. 3B is a diagram of another desired spectrum in the frequency domain.

FIG. 3B is a diagram of another desired spectrum in the frequency domain. As in FIG. 3A, the desired spectrum 306 is shown in solid line, and the spectrum with bad S21 compensation 308 is shown in dashed line. It should be appreciated that S21 optimization is agnostic to whatever target pulse shape is desired, and is thus applicable to not only the desired spectra shown in FIGS. 3A and 3B but also further desired spectra.

Figure 3C:
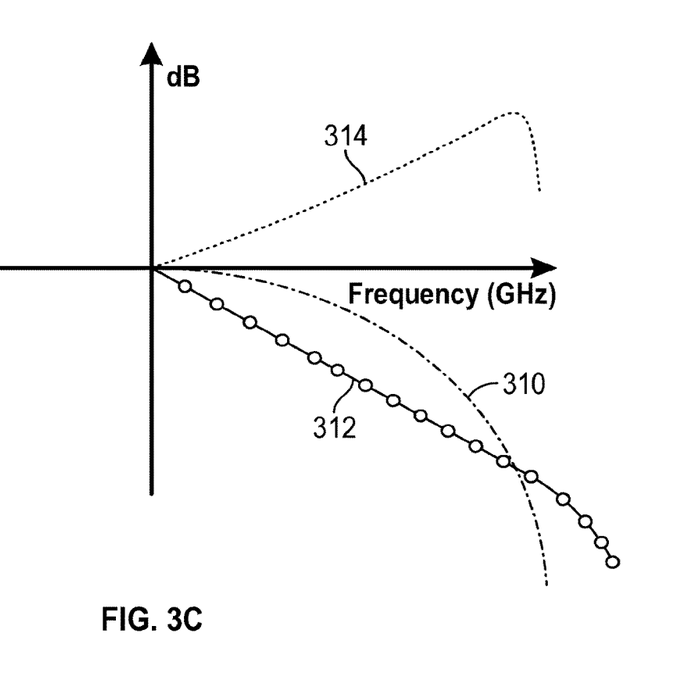
FIG. 3C depicts a target spectrum, an S21 loss, and a resulting target output, in the frequency domain.

FIG. 3C depicts a target spectrum 310, an S21 loss 312, and a resulting target output 314, in the frequency domain. The resulting target output 314 is produced by dividing the target spectrum 310 by the S21 loss 312, in the frequency domain. S21s in general are very smooth functions despite having different possible slopes and/or curvature. so they could be interpolated with linear or quadratic functions. This pre-knowledge is key in collapsing the degrees of freedom from 65× (in some embodiments, or some other number of degrees of freedom) in the time domain to 3× to 5× max in the frequency domain.

Figure 4:
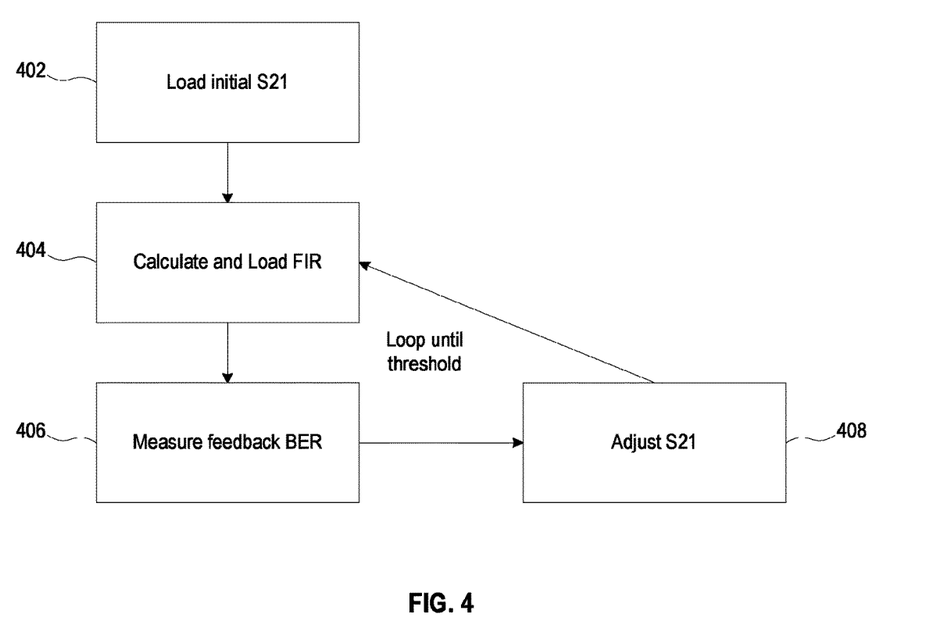
FIG. 4 is a flow diagram of a method of determining frequency-dependent preemphasis for a transmitter of the network switch of FIG. 1 in accordance with some embodiments.

FIG. 4 is a flow diagram of a method of determining frequency-dependent preemphasis for a transmitter of the network switch 102 of FIG. 1. This method is performed by the network switch 102, more specifically by the digital signal processor 104. In further embodiments, one or more further processors could assist or cooperate with the digital signal processor.

In an action 402, the network switch 102 loads the initial S21. In one version, the initial S21 is determined empirically in a laboratory, then distributed as part of software to customers. For some digital signal processors, this involves reading and writing registers on the DSP chip.

In an action 404, the network switch 102 calculates and loads the finite impulse response filter. Programming code for the digital signal processor to do so could be developed from the following pseudocode. It should be appreciated that the use of 65 sample points is implementation specific to one embodiment, and other numbers of sample points can be used in further embodiments.

1. define 3-5 points
2. fit with linear, quadratic or whatever (in dB scale):Impose a smoothness restriction based on expected behavior of channel loss
3. sample the fit with 65 or more points (65 is enough)
4. define the target desired spectrum (e.g. Root raised cosine with rolloff 1.0 to 0.0)
5. sample the target spectrum with same number of points as 3 (fixed at step 3)
6. in dBs:subtract the 3 from 5 and obtain the pre-emphasis as a function of frequency with 65 or points or (fixed at step 3)
7. convert dBs to linear 8. take the IFFT of 7 to obtain the pre-emphasised finite impulse response "pre-emp FIR" . . . 65 points or more (fixed at step 3)
9. fit the resulting 65× or so time domain points with a cubic spline fit or any fit that maintains the overall "Sinc" shape
10. shift the fit by a fraction of T/2 to skew different lanes (time shift)
11. Resample the shifted time domain FIR by 65×T/2 spaced points=>Must be 65 here:constrained by FIR hardware implementation . . . ready for loading
12. Load the 65× numbers into their respective dsp registers In some embodiments, the system interpolates additional points for calculation of the finite impulse response filter taps. The exact number of control points and the type of curve fitting used on interpolation may be system specific.

In an action 406 of FIG. 4, the network switch 102 measures the feedback bit error rate (BER). This is a form of characterizing the looped back, received signal that has the frequency-dependent preemphasis from the finite impulse response filter. Bit error rate is the ratio of bits received incorrectly out of total bits received. Other figures of merit could be developed and used in keeping with the teachings herein. In some embodiments, measuring the bit error rate involves reading and writing registers in the DSP chip. Programming code for the Digital Signal Processor to do so could be developed from the following psuedocode 1. Let DSP converge
2. Read and calculate BER, Q, SNR, MSE (mean squared error), or other figure of merit
3. Define an error function Epsilon from previous reading In an action 408, the network switch 102 adjusts the S21. Programming code for the digital signal processor to do so could be developed from the following method, which uses gradient descent.

1. For each degree of freedom, one at a time, adjust a small amount in the positive direction.
2. After all degrees of freedom are measured, a gradient vector is calculated.
3. Adjust initial point proportionately to negative gradient vector (downhill, in the direction of minimizing).
4. Reset to step 1 with new adjusted initial point.
5. Repeat until gradient vector or BER becomes sufficiently small (e.g., meets a threshold) or a fixed number of iterations is completed (e.g., the number of iterations meets a threshold).

As explained in the above method action 5, the system repeats, i.e., iterates, the adjustment of the model, e.g. by moving a control point or changing a slope of a line or line segment of the model, until some threshold of optimization is met. The threshold could be that the gradient vector becomes sufficiently small, the bit error rate becomes sufficiently low, or a particular number of iterations has been performed, etc. During the iteration, comparison could be made between present bit error rate and previous iteration bit error rate, or base level bit error rate. In variations, more than one degree of freedom could be adjusted at a time, other characterizations could be applied, or other optimizing techniques could be used.

Figure 5:
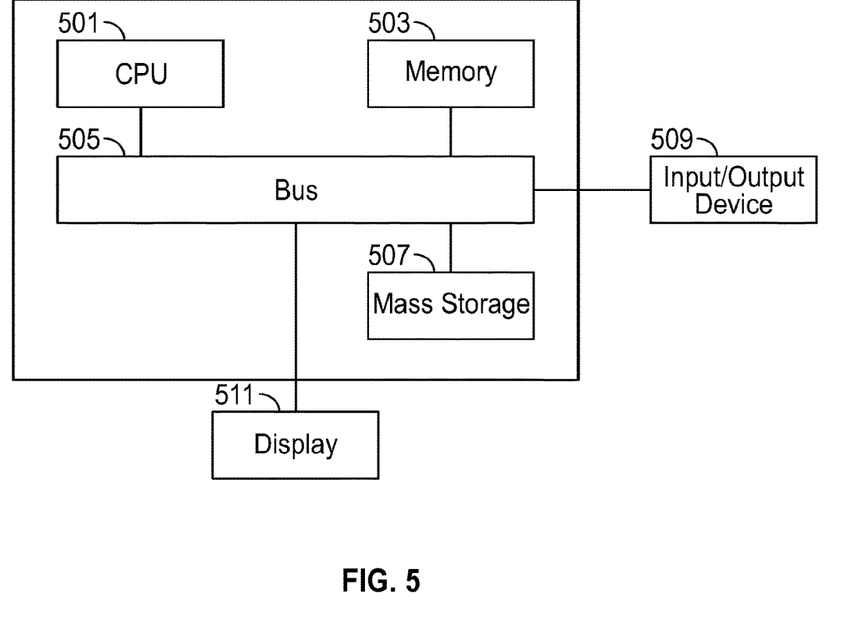
FIG. 5 is an illustration showing an exemplary computing device which may implement the embodiments described herein.

It should be appreciated that the methods described herein may be performed with a digital processing system, such as a conventional, general-purpose computer system. Special purpose computers, which are designed or programmed to perform only one function may be used in the alternative. FIG. 5 is an illustration showing an exemplary computing device which may implement the embodiments described herein. The computing device of FIG. 5 may be used to perform embodiments of the functionality for auto-equalization in accordance with some embodiments. The computing device includes a central processing unit (CPU) 501, which is coupled through a bus 505 to a memory 503, and mass storage device 507. Mass storage device 507 represents a persistent data storage device such as a floppy disc drive or a fixed disc drive, which may be local or remote in some embodiments. The mass storage device 507 could implement a backup storage, in some embodiments. Memory 503 may include read only memory, random access memory, etc. Applications resident on the computing device may be stored on or accessed via a computer readable medium such as memory 503 or mass storage device 507 in some embodiments. Applications may also be in the form of modulated electronic signals modulated accessed via a network modem or other network interface of the computing device. It should be appreciated that CPU 501 may be embodied in a general-purpose processor, a special purpose processor, or a specially programmed logic device in some embodiments.

Display 511 is in communication with CPU 501, memory 503, and mass storage device 507, through bus 505. Display 511 is configured to display any visualization tools or reports associated with the system described herein. Input/output device 509 is coupled to bus 505 in order to communicate information in command selections to CPU 501. It should be appreciated that data to and from external devices may be communicated through the input/output device 509. CPU 501 can be defined to execute the functionality described herein to enable the functionality described with reference to FIGS. 1-4. The code embodying this functionality may be stored within memory 503 or mass storage device 507 for execution by a processor such as CPU 501 in some embodiments. The operating system on the computing device may be iOS™, MS-WINDOWS™, OS/2™, UNIX™, LINUX™, or other known operating systems. It should be appreciated that the embodiments described herein may also be integrated with a virtualized computing system implemented with physical computing resources.

Detailed illustrative embodiments are disclosed herein. However, specific functional details disclosed herein are merely representative for purposes of describing embodiments. Embodiments may, however, be embodied in many alternate forms and should not be construed as limited to only the embodiments set forth herein.

It should be understood that although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

With the above embodiments in mind, it should be understood that the embodiments might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing. Any of the operations described herein that form part of the embodiments are useful machine operations. The embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

A module, an application, a layer, an agent or other method-operable entity could be implemented as hardware, firmware, or a processor executing software, or combinations thereof. It should be appreciated that, where a software-based embodiment is disclosed herein, the software can be embodied in a physical machine such as a controller. For example, a controller could include a first module and a second module. A controller could be configured to perform various actions, e.g., of a method, an application, a layer or an agent.

The embodiments can also be embodied as computer readable code on a tangible non-transitory computer readable medium. The computer readable medium is any data storage device that can store data, which can be thereafter read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion. Embodiments described herein may be practiced with various computer system configurations including hand-held devices, tablets, microprocessor systems, microprocessor-based or programmable consumer electronics, minicomputers, mainframe computers and the like. The embodiments can also be practiced in distributed computing environments where tasks are performed by remote processing devices that are linked through a wire-based or wireless network.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

In various embodiments, one or more portions of the methods and mechanisms described herein may form part of a cloud-computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated.

Various units, circuits, or other components may be described or claimed as "configured to" perform a task or tasks. In such contexts, the phrase "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. An auto-equalization network device for assistance in determining a frequency domain forward transmission loss characterization for a signal, comprising:
   a network device configured to:
   generate and load finite impulse response (FIR) filter taps into a finite impulse response filter; and
   iterate:
      transmission of a signal with frequency-dependent pre-emphasis by the finite impulse response filter;

characterization for the frequency-dependent preemphasized signal as looped back and received by the network device;
comparison to a previous characterization; and
reloading the finite impulse response filter taps, until the comparison meets a threshold of optimization.

2. The auto-equalization network device of claim 1, wherein:
frequency domain characterization and modeling are based on S21 forward transmission coefficient measurement and modeling; and
characterization for the frequency-dependent pre-emphasized signal as looped back and received by the network device is based on measuring bit error rate (BER).

3. The auto-equalization network device of claim 1, wherein a model is generated in the frequency domain having control points based on the characterization, and wherein the model having the control points has three, four or five degrees of freedom.

4. The auto-equalization network device of claim 1, wherein adjustment of the control points is performed using a gradient vector with gradient descent.

5. The auto-equalization network device of claim 1, wherein the comparison meets the threshold relates to a gradient vector, a bit error rate, or a number of iterations.

6. The auto-equalization network device of claim 1, wherein the network device is configured to:
resample, with a specified number of data points, an S21 measurement;
calculate a frequency-dependent preemphasis as a target spectrum minus the resampled S21;
calculate an impulse as an inverse fast Fourier transform (inverse FFT) of the preemphasis;
normalize a magnitude of the impulse;
scale amplitude of taps to match modulation format; and
interpolate the taps with forward or backward shift to adjust for skew.

7. The auto-equalization network device of claim 1, wherein each iteration of the adjustment of the control points comprises:
adjustment of one degree of freedom at a time;
measurement of bit error rate (BER) after each adjustment;
determining a gradient vector after all degrees of freedom are measured; and
adjustment of a control point proportional to a negative gradient vector, to minimize for gradient descent.

8. A method for auto-equalization of a network device, performed by the network device, comprising:
generating filter taps for a finite impulse response filter (FIR);
iterating:
transmitting a signal with frequency-dependent preemphasis by the finite impulse response filter having the filter taps;
determining a characterization, for the signal with frequency-dependent preemphasis as looped back and received by the network device;
comparing the characterization to a previous characterization; and
retaining the filter taps, or modified versions thereof, in the finite impulse response filter, responsive to the comparing meeting a threshold of optimization.

9. The method of claim 8, wherein:
the determining the characterization of forward transmission losses in the frequency domain comprises determining an S21 forward transmission coefficient measurement;
the determining the further characterization in the frequency domain comprises measuring bit error rate (BER); and
the previous characterization is one of a base level bit error rate or the bit error rate of a previous iteration.

10. The method of claim 8, wherein a model is formed with the control points, the model having three, four, or five degrees of freedom.

11. The method of claim 8, wherein the iterating comprises gradient descent with variation to control points as gradient vectors.

12. The method of claim 8, wherein the iterating and the comparing meeting a threshold of optimization comprises at least one of:
determining a gradient descent with variation of control points as gradient vectors so that a gradient meets the threshold of optimization;
determining a bit error rate (BER) that meets the threshold of optimization; or
a number of iterations of the comparing meets the threshold of optimization.

13. The method of claim 8, wherein the generating the filter taps comprises:
determining a frequency-dependent preemphasis as a target spectrum minus a resampled S21;
determining an impulse as an inverse fast Fourier transform (inverse FFT) of the preemphasis;
normalizing a magnitude of the impulse;
scaling an amplitude of taps to match a modulation format; and
interpolating the taps with forward or backward shift to adjust for skew.

14. The method of claim 8, wherein the iterating further comprises:
adjusting one degree of freedom at a time;
measurement of bit error rate (BER) after the adjusting of one degree of freedom;
determining a gradient vector for the control points after the determining the further characterization; and
adjustment of a control point in accordance with a negative gradient vector.

15. A tangible, non-transitory, computer-readable media having instructions thereupon which, when executed by a processor, cause the processor to perform a method comprising:
generating filter taps for a finite impulse response (FIR) filter of a network device;
transmitting a signal that has frequency-dependent preemphasis by the finite impulse response filter with the filter taps;
characterizing the transmitted signal that has the frequency-dependent preemphasis, as looped back and received by the network device; and
iterating the generating the filter taps, transmitting the signal that has frequency-dependent preemphasis, the characterizing the transmitted signal that has the frequency-dependent preemphasis as looped back and received, with variation of at least one control point, until the characterizing meets a threshold of optimization.

16. The computer-readable media of claim 15, wherein:
the characterizing in the frequency domain comprises characterizing an S21 forward transmission coefficient; and
the characterizing the transmitted signal that has the frequency-dependent preemphasis, as looped back and received by the network device comprises determining bit error rate (BER) of the signal as received by the network device.

17. The computer-readable media of claim 15, wherein a model is generated with the control points and the model has three to five degrees of freedom of the control points.

18. The computer-readable media of claim 15, wherein the iterating until the characterizing meets the threshold comprises at least one of:
varying control points with a gradient descent of gradient vectors of the control points until a gradient meets the threshold of optimization;
determining that a bit error rate (BER) of the signal with the frequency-dependent preemphasis as looped back and received meets the threshold of optimization; or
completing a threshold number of iterations including the characterizing.

19. The computer-readable media of claim 15, wherein the generating the filter taps comprises:
determining a frequency-dependent preemphasis for the finite impulse response filter as a target spectrum for a received signal minus a resampled S21 characterization of the received signal;
determining an impulse for a transmitted signal as an inverse fast Fourier transform (inverse FFT) of the frequency-dependent preemphasis;
normalizing magnitude of the impulse;
scaling amplitude of taps to match a modulation format; and
interpolating tap values with forward or backward shift to adjust for skew.

20. The computer-readable media of claim 15, wherein the iterating further comprises:
adjusting at least one degree of freedom in the model with the control points;
measurement of bit error rate (BER) after the adjusting of the at least one degree of freedom;
calculating a gradient vector for at least one control point relative to the characterizing for the transmitted signal that has the frequency-dependent preemphasis as looped back and received; and
adjustment of the at least one control point relative to the gradient vector.

* * * * *